(12) United States Patent
Chen et al.

(10) Patent No.: US 12,231,436 B2
(45) Date of Patent: Feb. 18, 2025

(54) METHOD FOR PERMISSION MANAGEMENT

(71) Applicants: Inventec (Pudong) Technology Corporation, Shanghai (CN); INVENTEC CORPORATION, Taipei (TW)

(72) Inventors: Wei-Chao Chen, Taipei (TW); Ming-Chi Chang, Taipei (TW); Chih-Pin Wei, Taipei (TW); Chuo-Jui Wu, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 201 days.

(21) Appl. No.: 18/069,949

(22) Filed: Dec. 21, 2022

(65) Prior Publication Data
US 2024/0154972 A1 May 9, 2024

(30) Foreign Application Priority Data
Nov. 3, 2022 (CN) .......................... 202211369057.X

(51) Int. Cl.
*H04L 9/40* (2022.01)
(52) U.S. Cl.
CPC .......... *H04L 63/105* (2013.01); *H04L 63/104* (2013.01)
(58) Field of Classification Search
CPC ...... H04L 63/10; H04L 63/104; H04L 63/105
USPC ................................................. 726/4, 17, 21
See application file for complete search history.

(56) References Cited

U.S. PATENT DOCUMENTS

| | | | |
|---|---|---|---|
| 10,032,045 B2 * | 7/2018 | Barrett ................. | H04L 63/102 |
| 10,554,667 B2 * | 2/2020 | Wang .................... | H04L 63/105 |
| 11,870,784 B2 * | 1/2024 | Zezza .................. | H04L 63/105 |
| 2002/0026592 A1 * | 2/2002 | Gavrila ............... | G06F 21/6218 726/6 |
| 2019/0230088 A1 * | 7/2019 | Rice ...................... | H04L 63/102 |
| 2020/0051127 A1 * | 2/2020 | Johnson ............. | G06Q 30/0257 |

\* cited by examiner

*Primary Examiner* — Bharat Barot
(74) *Attorney, Agent, or Firm* — CKC & Partners Co., LLC

(57) ABSTRACT

A method for permission management includes: generating a plurality of job roles with different permissions according to organization permission table; generating first permission structure directed graph according to the job roles; selecting one of the job roles in first permission structure directed graph as target job role; generating minimum directed spanning graph in first permission structure directed graph according to target job role; determining whether permission of each of the job roles in first permission structure directed graph matches job of each of the job roles in first permission structure directed graph; and adjusting permission and job of each of the job roles to generate second permission structure directed graph if it is determined that permission of each of the job roles in first permission structure directed graph does not match job of each of the job roles in first permission structure directed graph.

9 Claims, 8 Drawing Sheets

… (1)

METHOD FOR PERMISSION MANAGEMENT

CROSS-REFERENCE TO RELATED APPLICATION

This application claims priority to China Application Serial Number 202211369057.X, filed on Nov. 3, 2022, which is herein incorporated by reference in its entirety.

BACKGROUND

Field of Invention

The present disclosure relates to a management method. More particularly, the present disclosure relates to a method for permission management.

Description of Related Art

Conventional permission management systems stores hundreds of reports, and managers of an information technology department usually set up report management permissions according to needs of company personnel. However, managers of an information technology department cannot determine whether permissions of a supervisor role are greater than all permissions of his subordinate roles. A supervisor does not know which reports a supervisor role cannot see but subordinate roles can see. Therefore, an information gap between a supervisor and subordinate roles may delay a decision-making time of a supervisor.

For the foregoing reason, there is a need to provide other suitable method for permission management to solve the problems of the prior art.

SUMMARY

One aspect of the present disclosure provides a method for permission management. method for permission management includes following steps of: generating a plurality of job roles with different permissions according to an organization permission table by a management system; generating a first permission structure directed graph according to the plurality of job roles by the management system; selecting one of the plurality of job roles in the first permission structure directed graph as a target job role by the management system; generating a minimum directed spanning graph in the first permission structure directed graph according to the target job role by the management system; determining whether a permission of each of the plurality of job roles in the first permission structure directed graph matches a job of each of the plurality of job roles in the first permission structure directed graph by the management system; and adjusting the permission and the job of each of the plurality of job roles so as to generate a second permission structure directed graph if it is determined that the permission of each of the plurality of job roles in the first permission structure directed graph does not match the job of each of the plurality of job roles in the first permission structure directed graph by the management system.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
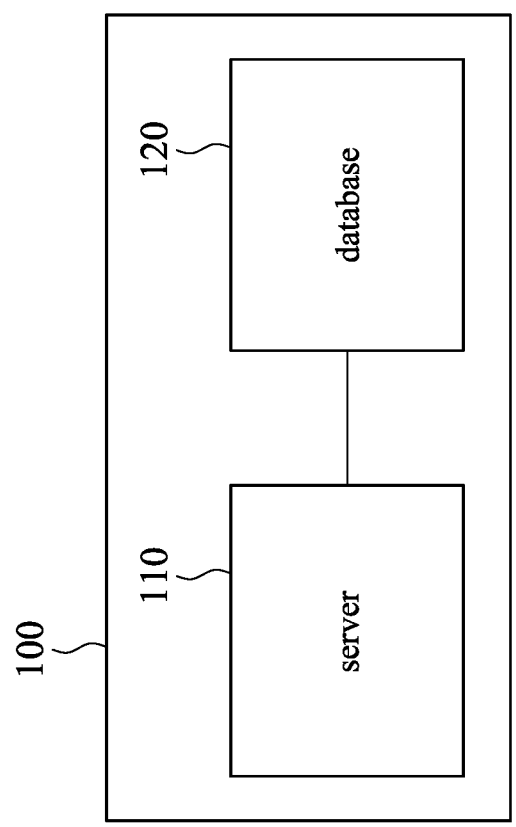
FIG. 1 depicts a schematic diagram of a management system according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise.

Furthermore, it should be understood that the terms, "comprising", "including", "having", "containing", "involving" and the like, used herein are open-ended, that is, including but not limited to.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

FIG. 1 depicts a schematic diagram of a management system 100 according to some embodiments of the present disclosure. In some embodiments, please refer to FIG. 1, the management system 100 includes a server 110 and a database 120. The server 110 is coupled to the database 120.

In some embodiments, the database 120 of the management system 100 is configured to store an organization permission table. The server 110 of the management system 100 is configured to generate a plurality of job roles with different permissions according to an organization permission table. The server 110 of the management system 100 is configured to generate a first permission structure directed graph according to the plurality of job roles.

Then, please refer to FIG. 1, the server 110 of the management system 100 is configured to select one of the plurality of job roles in the first permission structure directed graph as a target job role. The server 110 of the management system 100 is configured to generate a minimum directed spanning graph in the first permission structure directed graph according to the target job role.

Furthermore, the server 110 of the management system 100 is configured to determine whether a permission of each of the plurality of job roles in the first permission structure directed graph matches a job of each of the plurality of job roles in the first permission structure directed graph. If it is determined that the permission of each of the plurality of job roles in the first permission structure directed graph does not match the job of each of the plurality of job roles in the first permission structure directed graph, the server 110 of the management system 100 is configured to adjust the permission and the job of each of the plurality of job roles so as to generate a second permission structure directed graph.

Figure 2:
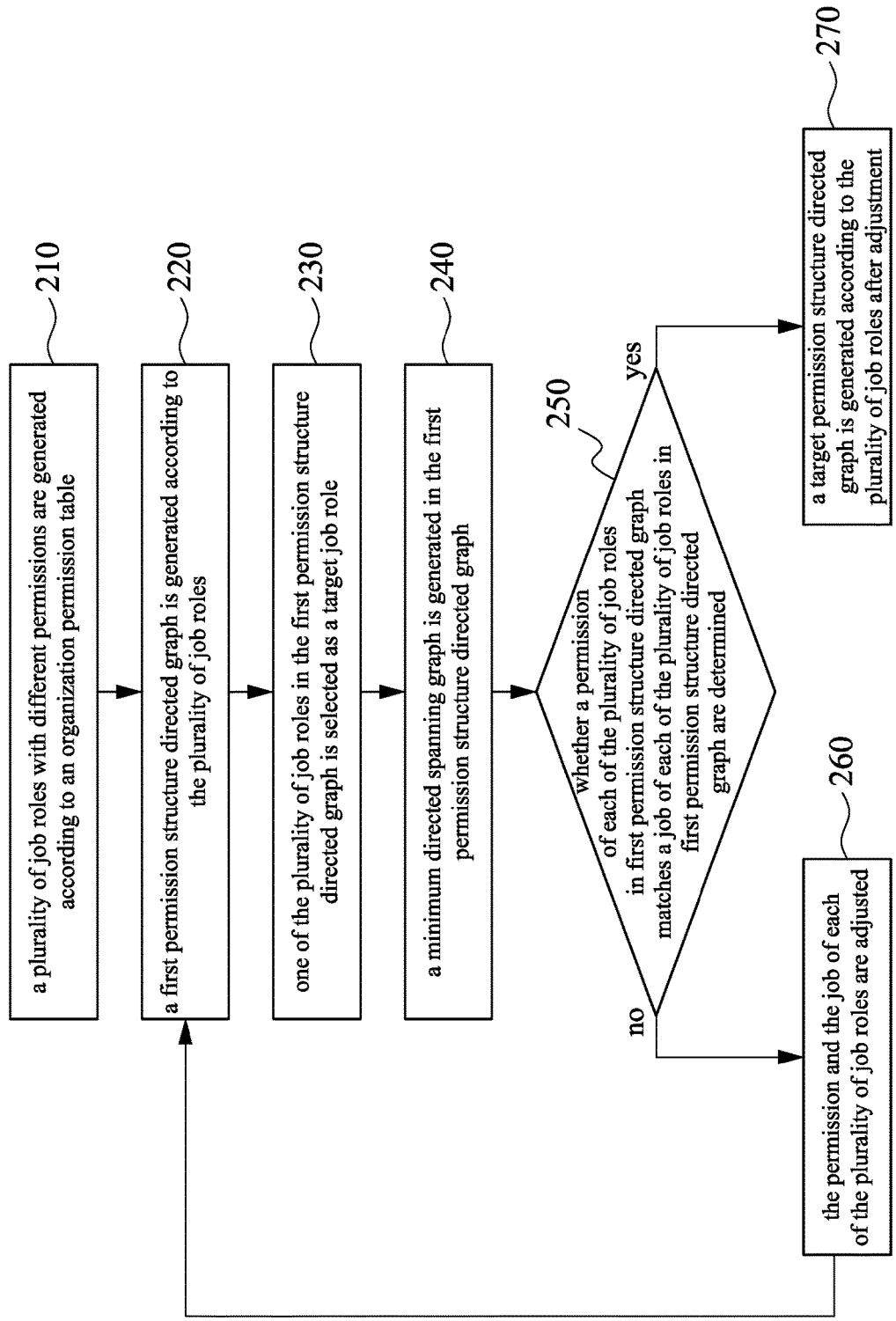
FIG. 2 depicts a flow chart of a method for permission management according to some embodiments of the present disclosure.

FIG. 2 depicts a flow chart of a method for permission management 200 according to some embodiments of the present disclosure. In some embodiments, in order to facilitate the understanding of the method for permission management 200, please refer to FIG. 1 to FIG. 8, the aforementioned FIG. 3 to FIG. 8 are a schematic diagram of a permission structure directed graph of the method for permission management 200 according to some embodiments of the present disclosure. In some embodiments, the method for permission management 200 can be executed by the management system 100 of FIG. 1, and related operation methods can refer to FIG. 3 to FIG. 8, which will be described in detail later.

In step 210, a plurality of job roles with different permissions are generated according to an organization permission table.

Figure 3:
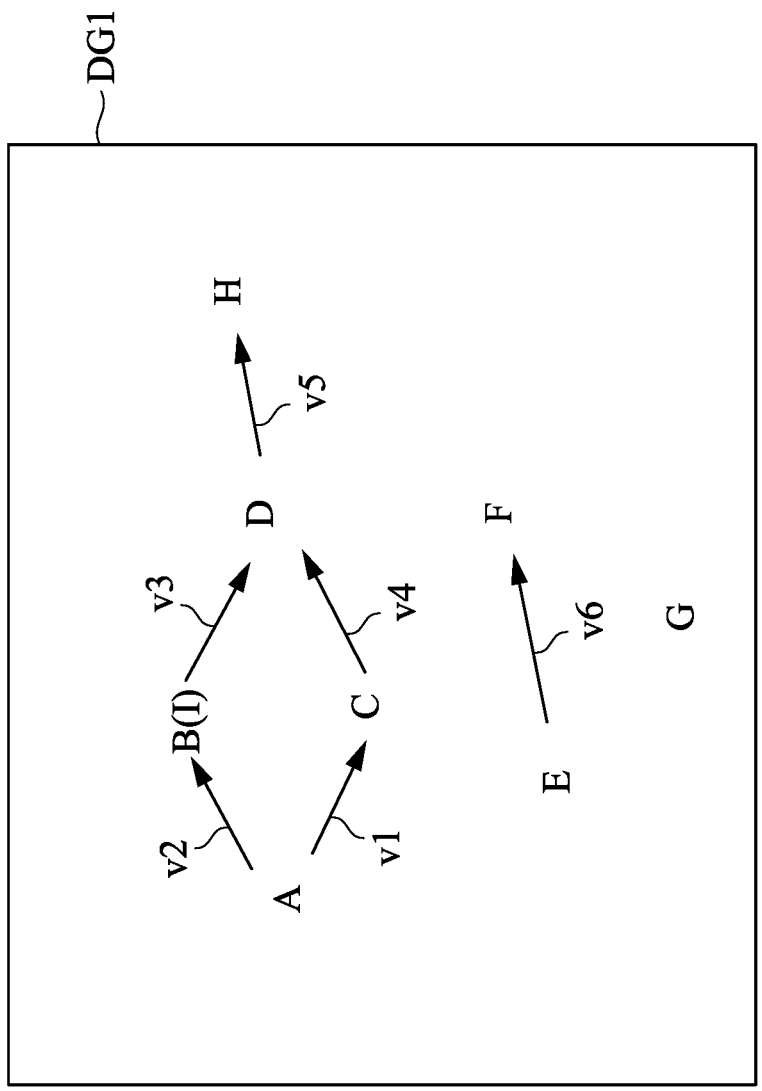
FIG. 3 depicts a schematic diagram of a permission structure directed graph of a method for permission management according to some embodiments of the present disclosure.

For example, please refer to FIG. 1 to FIG. 3, the server 110 of the management system 100 is configured to generate a plurality of job roles with different permissions (e.g.: a job role A to a job role G) according to an organization permission table of the database 120.

In step 220, a first permission structure directed graph is generated according to the plurality of job roles.

For example, please refer to FIG. 1 to FIG. 3, the server 110 of the management system 100 is configured to generate a first permission structure directed graph DG1 according to the plurality of job roles (e.g.: a job role A to a job role G).

In some embodiments, the plurality of job roles include a first job role (e.g.: a job role B) and a second job role (e.g.: a job role I). The first job role (e.g.: the job role B) includes a plurality of first permissions. The second job role (e.g.: the job role I) includes a plurality of second permissions.

Then, if a first number of the plurality of first permissions of the first job role (e.g.: the job role B) and a second number of the plurality of second permissions of the second job role (e.g.: the job role I) are the same, the server 110 of the management system 100 is configured to determine whether a type of each of the plurality of first permissions and a type of each of the plurality of second permissions are the same.

Further, if the type of each of the plurality of first permissions and the type of each of the plurality of second permissions are the same, the server 110 of the management system 100 is configured to select one of the first job role and the second job role (e.g.: select the job role B), and generate the first permission structure directed graph DG1 according to the one of the first job role and the second job role.

For example, please refer to 3, the job role B has 4 kinds of permissions, and the job role I also has 4 kinds of permissions. At this time, the server 110 of the management system 100 is configured to determine whether the 4 kinds of permissions of the job role B and the 4 kinds of permissions of the job role I are the same. If the 4 kinds of permissions of the job role B and the 4 kinds of permissions of the job role I are determined to be the same, the job role B is selected as a representative to generate the first permission structure directed graph DG1.

It should be noted that a purpose of a step of determining whether the permissions of the job role are the same is to simplify the job role with the same permission so that the first permission structure directed graph DG1 is a concise diagram. It is further explained that when a group expands and subdivides many subsidiary units or a number of job roles of a group is increasing, a step of determining whether the permissions of the job role are the same helps to simplify pieces of permission management data.

In some embodiments, please refer FIG. 1 to FIG. 3, if a first number of the plurality of first permissions of the first job role (e.g.: the job role C) and a second number of the plurality of second permissions of the second job role (e.g.: the job role B) are the same, the server 110 of the management system 100 is configured to determine whether a first type of each of the plurality of first permissions and a second type of each of the plurality of second permissions are the same.

Then, if the first type of each of the plurality of first permissions and the second type of each of the plurality of second permissions are not the same, the server 110 of the management system 100 is configured to determine that the first job role (e.g.: the job role C) and the second job role (e.g.: the job role B) are different so as to generate the first permission structure directed graph DG1 according to the first job role (e.g.: the job role C) and the second job role (e.g.: the job role B).

For example, please refer to FIG. 3, the job role B has 4 kinds of permissions, and the job role C also has 4 kinds of permissions. At this time, the server 110 of the management system 100 is configured to determine whether the 4 kinds of permissions of the job role B and the 4 kinds of permissions of the job role C are the same. If it is determined that one of the 4 kinds of permissions of the job role B and one of the 4 kinds of permissions of the job role C are different, the server 110 of the management system 100 is configured to generate the first permission structure directed graph DG1 shown in FIG. 3 according to the job role B and the job role C.

In some embodiments, please refer to FIG. 1 to FIG. 3, the plurality of job roles further includes a third job role (e.g.: the job role A). The third job role (e.g.: the job role A) includes a plurality of third permissions. If a third number of the plurality of third permissions is smaller than the first number of the plurality of first permissions and the plurality of first permissions include the plurality of third permissions, the server 110 of the management system 100 is configured to generate a permission vector v1 based on the third job role (e.g.: the job role A) so as to link the permission vector v1 from the third job role (e.g.: the job role A) to the first job role (e.g.: the job role C). Generation methods of permission vector v2 to permission vector v6 are the same as a generation method of permission vector v1, and repetitious details are omitted herein.

It should be noted that the plurality of first permissions include the plurality of third permissions means that the plurality of first permissions of the first job role cover the plurality of third permissions owned by the third job role. For example, the job role C has 4 kinds of permissions, which are a first production line report, a second production line report, a first product experiment report, and a second product experiment report. The job role A has 3 kinds of permissions, which are a first production line report, a first product experiment report, and a second product experiment report.

It is further explained that a graph whose edges are directed is called a directed graph or a digraph. The permission structure directed graph of the present disclosure must point from a job role with less permissions to a job role with more permissions.

In some embodiments, please refer to FIG. 1 to FIG. 3, the server 110 of the management system 100 is configured to calculate a weight value of the permission vector according to the first number of the plurality of first permissions and third number of the plurality of third permissions. A formula for calculating a weight value of the permission vector is as follows:

$$W = \left(\frac{M1}{M2}\right)^\alpha - 1 \qquad \text{formula 1}$$

In formula 1, W is a weight value of a permission vector. M1 is a number of permissions for a job role with more permissions. M2 is a number of permissions for a job role with less permissions. α is a preset value, and α is greater than or equal to 1.

For example, please refer to 3, assuming α=2 in formula 1, the job role C has 4 kinds of permissions and the job role A has 3 kinds of permissions. A weight value w1 of the permission vector v1 is calculated according to the aforementioned formula. Then the weight value w1 should be $$\left(\frac{4}{3}\right)^2 - 1,$$

and the simplified value of the weight value w1 is $$\frac{7}{9}.$$

In some embodiments, a formula for calculating the weight value of the permission vector of the present disclosure is not limited to the aforementioned formula 1. It should be noted that any formula that can calculate the weight value of the permission vector can be used. Calculation methods of the permission vector v2 to the permission vector v6 are the same as a calculation method of the permission vector v1, and repetitious details are omitted herein.

In some embodiments, please refer to FIG. 3, the method for permission management 200 of the present disclosure can calculate the permission vector v2 and the permission vector v3 of the job role A, the job role B, and the job role D according to the permissions. It should be noted that the method for permission management 200 of the present disclosure can also calculate a permission vector from the job role A to the job role D (not shown in figure) according to the permissions.

At this time, a weight value of the permission vector from the job role A to the job role D (not shown in figure) is modified by the weight value so as to make the weight value of the permission vector from the job role A to the job role D (not shown in figure) greater than the weight value of the permission vector v2 plus the weight value of the permission vector v3 to hide the permission vector from the job role A to the job role D (not shown in figure) so as to display the permission vector v2 and the permission vector v3. Finally, the method for permission management 200 of the present disclosure will present the first permission structure directed graph DG1 shown in FIG. 3.

In step 230, one of the plurality of job roles in the first permission structure directed graph is selected as a target job role.

Figure 4:
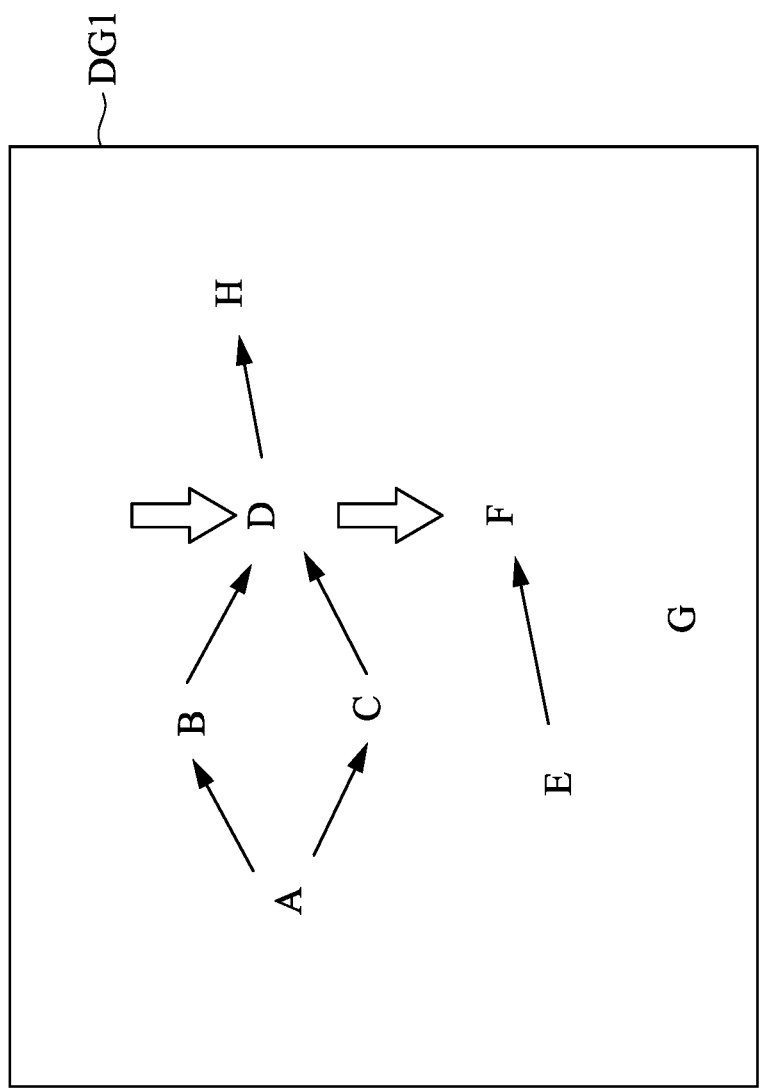
FIG. 4 depicts a schematic diagram of a permission structure directed graph of a method for permission management according to some embodiments of the present disclosure.

For example, please refer to FIG. 1, FIG. 2, and FIG. 4, the server 110 of the management system 100 is configured to select one of the plurality of job roles in the first permission structure directed graph DG1 (e.g.: select a job role D or select a job role F) as a target job role. It should be noted that the job role D can be a supervisor of a department in a group. The job role F is a supervisor of a different department from the job role D.

In step 240, a minimum directed spanning graph is generated in the first permission structure directed graph.

Following the above step 230, please refer to FIG. 1, FIG. 2, FIG. 4, and FIG. 5, the server 110 of the management system 100 is configured to select the target job role (e.g.: select the job role D), then, the server 110 of the management system 100 is configured to generate a minimum directed spanning graph MDG in the first permission structure directed graph DG1 according to the target job role (e.g.: select the job role D).

In some embodiments, the plurality of job roles include a plurality of first group roles (e.g.: the job role A, the job role B, the job role C, a job role D, and a job role H) and a plurality of second group roles (e.g.: a job role E, a job role F, and a job role G).

In some embodiments, the server 110 of the management system 100 is configured to select one of the plurality of first group roles (e.g.: select the job role D) as the target job role. The server 110 of the management system 100 is configured to generate the minimum directed spanning graph MDG shown in FIG. 5 according to the plurality of first group roles (e.g.: the job role A, the job role B, the job role C, the job role D, and the job role H) and the target job role (e.g.: the job role D).

In addition, the server 110 of the management system 100 is configured to select the plurality of second group roles (e.g.: the job role E, the job role F, and the job role G) as a plurality of isolated roles IR.

It should be noted that assuming that the job role H is a chairman or a general manager of a company. A meaning of the job role G in the diagram is that the job role G has special permission that the chairman or the general manager of the company does not have.

Following the above step 230, please refer to FIG. 1, FIG. 2, FIG. 4, and FIG. 6, the server 110 of the management system 100 is configured to select the target job role (e.g.: select the job role F). Then, the server 110 of the management system 100 is configured to generate the minimum directed spanning graph MDG in the first permission structure directed graph DG1 according to the target job role (e.g.: select the job role F).

In some embodiments, the plurality of job roles include a plurality of first group roles (e.g.: the job role E and the job role F) and a plurality of second group roles (e.g.: the job role A, the job role B, the job role C, the job role D, the job role H, and the job role G).

In some embodiments, the server 110 of the management system 100 is configured to select one of the plurality of first group roles (e.g.: select the job role F) as the target job role. The server 110 of the management system 100 is configured to generate the minimum directed spanning graph MDG shown in FIG. 6 according to the plurality of first group roles (e.g.: the job role E and the job role F) and the target job role (e.g.: the job role F).

In addition, the server 110 of the management system 100 is configured to select the plurality of second group roles (e.g.: the job role A, the job role B, the job role C, the job role D, the job role H, and the job role G) as a plurality of isolated roles IR.

In step 250, whether a permission of each of the plurality of job roles in first permission structure directed graph matches a job of each of the plurality of job roles in first permission structure directed graph are determined.

Figure 5:
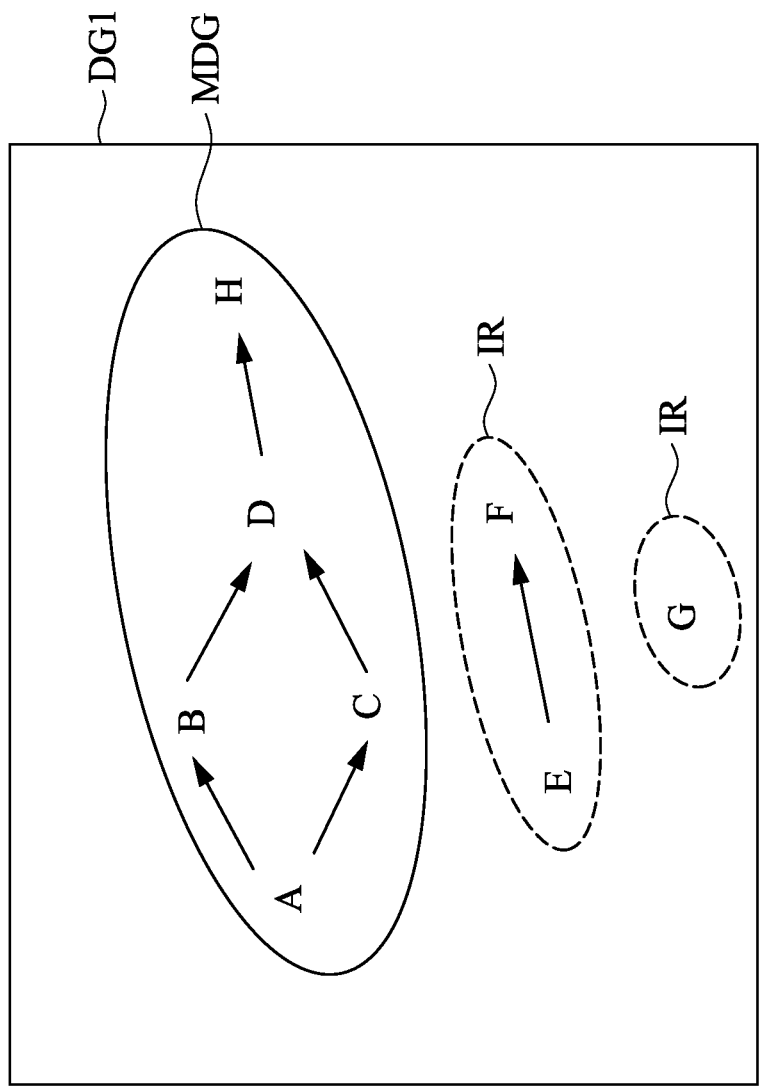
FIG. 5 depicts a schematic diagram of a permission structure directed graph of a method for permission management according to some embodiments of the present disclosure.

For example, following the above step 240, please refer to FIG. 1, FIG. 2, and FIG. 5, the server 110 of the management system 100 is configured to determine whether the permission of the plurality of second group roles (e.g.: the job role E, the job role F, and the job role G) matches the job of the plurality of second group roles (e.g.: the job role E, the job role F, and the job role G) as the plurality of isolated roles IR. If it is determined that the permission of the plurality of second group roles as the plurality of isolated roles IR does not match the job of the plurality of second group roles as the plurality of isolated roles IR, the server 110 of the management system 100 is configured to execute the step 260.

Then, if the permission of the plurality of second group roles as the plurality of isolated roles IR matches the job of the plurality of second group roles as the plurality of isolated roles IR, the server 110 of the management system 100 is configured to determine whether the permission of each of the plurality of job roles (e.g.: the job role A, the job role B, the job role C, the job role D, and, the job role H) in the minimum directed spanning graph MDG of the first permission structure directed graph DG1 matches the job of each of the plurality of job roles (e.g.: the job role A, the job role B, the job role C, the job role D, and, the job role H) in the minimum directed spanning graph MDG of the first permission structure directed graph DG1. If it is determined that the permission of each of the plurality of job roles in the minimum directed spanning graph MDG of the first permission structure directed graph DG1 does not match the job of each of the plurality of job roles in the minimum directed spanning graph MDG of the first permission structure directed graph DG1, the server 110 of the management system 100 is configured to execute the step 260.

In addition, if the permission of each of the plurality of job roles in the minimum directed spanning graph MDG of the first permission structure directed graph DG1 matches the job of each of the plurality of job roles in the minimum directed spanning graph MDG of the first permission structure directed graph DG1, the server 110 of the management system 100 is configured to execute the step 270.

Figure 6:
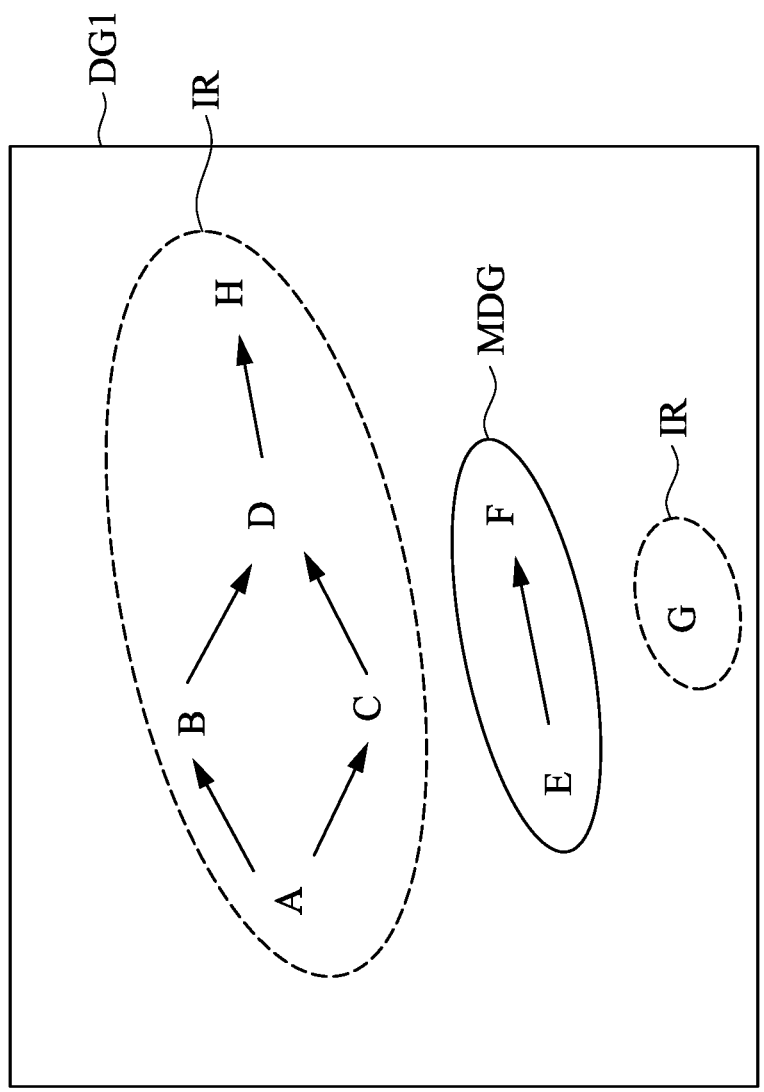
FIG. 6 depicts a schematic diagram of a permission structure directed graph of a method for permission management according to some embodiments of the present disclosure.

It should be noted that a judging method of the embodiment in FIG. 6 is the same as a judging method of the embodiment in FIG. 5, and repetitious details are omitted herein.

In step 260, the permission and the job of each of the plurality of job roles are adjusted.

Figure 7:
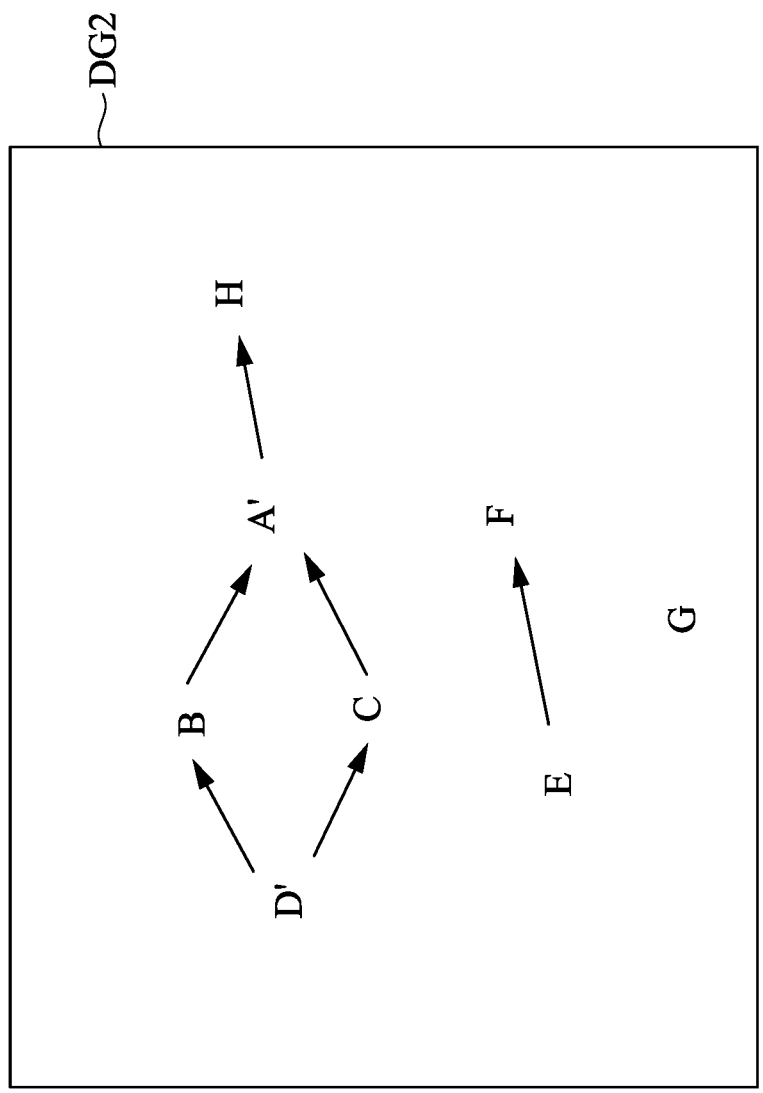
FIG. 7 depicts a schematic diagram of a permission structure directed graph of a method for permission management according to some embodiments of the present disclosure.

For example, following the above step 250, please refer to FIG. 1, FIG. 2, FIG. 5, and FIG. 7, if the permission of the plurality of second group roles (e.g.: the job role E, the job role F, and the job role G) as the plurality of isolated roles IR matches the job of the plurality of second group roles (e.g.: the job role E, the job role F, and the job role G) as the plurality of isolated roles IR and it is determined that the permission of each of the plurality of job roles(e.g.: the job role A, the job role B, the job role C, the job role D, and the job role H) in the minimum directed spanning graph MDG of the first permission structure directed graph DG1 does not match the job of each of the plurality of job roles(e.g.: the job role A, the job role B, the job role C, the job role D, and the job role H) in the minimum directed spanning graph MDG of the first permission structure directed graph DG1, the server 110 of the management system 100 is configured to adjust the permission and the job of plurality of job roles (e.g.: a job role A' and a job role D') so as to re-execute step 220 to generate a second permission structure directed graph DG2 shown in FIG. 7.

Then, for example, please refer to FIG. 1, FIG. 2, FIG. 5, and FIG. 7, the server 110 of the management system 100 is configured to determine that the job role A is a supervisor of a department, and has 3 kinds of permissions. The server 110 of the management system 100 is configured to determine that the job role D is a member of the department, and has 5 kinds of permissions. The server 110 of the management system 100 is configured to determine that the permissions and the job of the job role A do not match the permissions and the job of the job role D. The server 110 of the management system 100 is configured to adjust the job role A and the job role D in FIG. 5 into the job role A' and the job role D' in FIG. 7.

It should be noted that, the aforementioned step 220 to step 260 can be repeated.

In step 270, a target permission structure directed graph is generated according to the plurality of job roles after adjustment.

For example, following the step 260, please refer to FIG. 1, FIG. 2, FIG. 7, and FIG. 8, the second permission structure directed graph DG2 of FIG. 7 will be executed repeatedly by the server 110 of the management system 100 from the step 220 to the step 260. The permission of each of the plurality of job roles of the second permission structure directed graph DG2 of FIG. 7 matches the job of each of the plurality of job roles of the second permission structure directed graph DG2 of FIG. 7, and the server 110 of the management system 100 is configured to generate a target permission structure directed graph TDG shown in FIG. 8 according to the plurality of job roles after adjustment.

Figure 8:
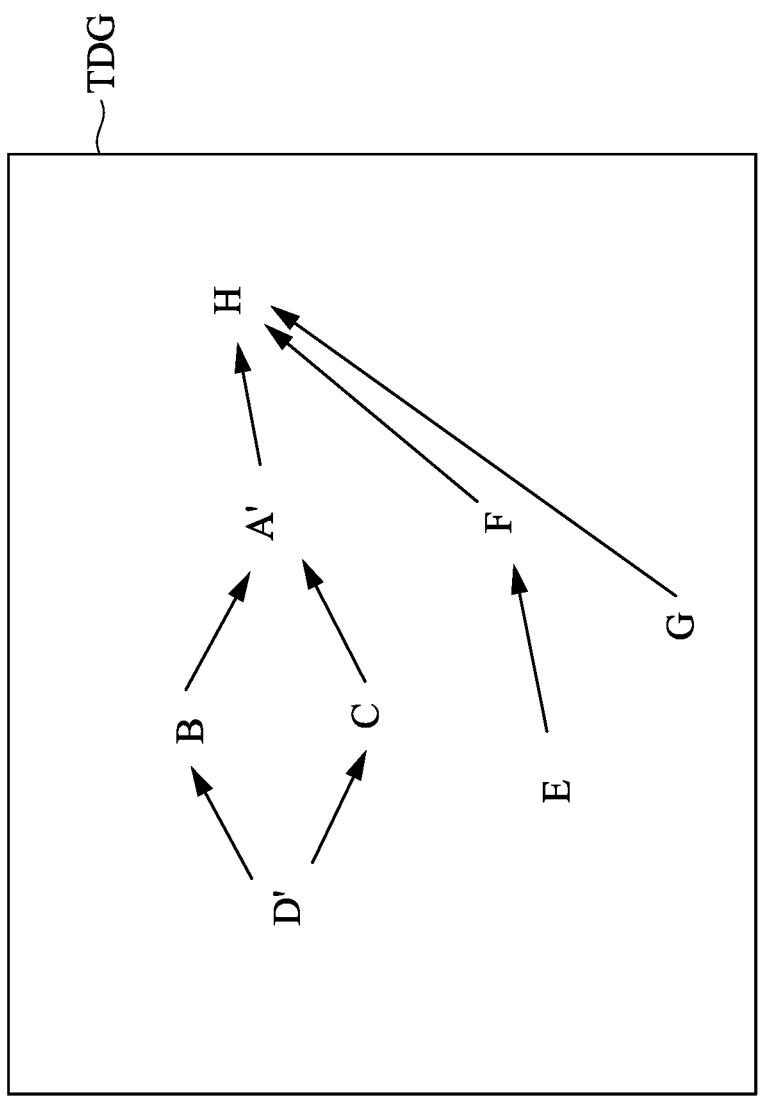
FIG. 8 depicts a schematic diagram of a permission structure directed graph of a method for permission management according to some embodiments of the present disclosure.

In some embodiments, please refer to FIG. 8, the job role H of the target permission structure directed graph TDG can be a chairman and a general manager of a company. In some embodiments, please refer to FIG. 8, the job role H of the target permission structure directed graph TDG can be a manager of a company. In other words, the method for permission management of present disclosure can be applied to a group or a department in a group.

In practice, pieces of permission management data are not limited to forms shown in the embodiments of FIG. 3 to FIG. 8, and the embodiments of FIG. 3 to FIG. 8 are only used for illustration. In some embodiments, forms of pieces of permission management data can be software spreadsheets, diagrams or documents.

Based on the above embodiments, the present disclosure provides a method for permission management to generate a permission structure directed graph and a minimum directed spanning graph so as to simplify huge data at first, and check a permission and a job of a plurality of job roles in a permission structure directed graph and a minimum directed spanning graph one by one so as to fine-tune a plurality of job roles that a permission does not match a job. In addition, a method for permission management of the present disclosure can enable managers of an information technology department to find job roles which a permission does not match a job so as to adjust job roles which a permission does not match a job when a group expands and subdivides many subsidiary units or a number of job roles of a group is increasing.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A method for permission management, comprising:
generating a plurality of job roles with different permissions according to an organization permission table by a management system;
generating a first permission structure directed graph according to the plurality of job roles by the management system;
selecting one of the plurality of job roles in the first permission structure directed graph as a target job role by the management system;
generating a minimum directed spanning graph in the first permission structure directed graph according to the target job role by the management system;
determining whether a permission of each of the plurality of job roles in the first permission structure directed graph matches a job of each of the plurality of job roles in the first permission structure directed graph by the management system;
adjusting the permission and the job of each of the plurality of job roles so as to generate a second permission structure directed graph by the management system if it is determined that the permission of each of the plurality of job roles in the first permission structure directed graph does not match the job of each of the plurality of job roles in the first permission structure directed graph; and
generating a target permission structure directed graph according to the plurality of job roles after adjustment by the management system if it is determined that the permission of each of the plurality of job roles in the second permission structure directed graph matches the job of each of the plurality of job roles in the second permission structure directed graph.

2. The method for permission management of claim 1, wherein the plurality of job roles comprise a first job role and a second job role, wherein the first job role comprises a plurality of first permissions, wherein the second job role comprises a plurality of second permissions, wherein generating the first permission structure directed graph according to the plurality of job roles by the management system comprises:
determining whether a first type of each of the plurality of first permissions and a second type of each of the plurality of second permissions are a same by the management system if a first number of the plurality of first permissions and a second number of the plurality of second permissions are a same; and
selecting one of the first job role and the second job role and generating the first permission structure directed graph according to the one of the first job role and the second job role by the management system if the first type of each of the plurality of first permissions and the second type of each of the plurality of second permissions are a same.

3. The method for permission management of claim 2, wherein generating the first permission structure directed graph according to the plurality of job roles by the management system further comprises:
determining that the first job role and the second job role are different by the management system if the first type of each of the plurality of first permissions and the second type of each of the plurality of second permissions are not a same so as to generate the first permission structure directed graph according to the first job role and the second job role.

4. The method for permission management of claim 2, wherein the plurality of job roles further comprises a third job role, wherein the third job role comprises a plurality of third permissions, wherein generating the first permission structure directed graph according to the plurality of job roles by the management system further comprises:
generating a permission vector based on the third job role by the management system if a third number of the plurality of third permissions is smaller than the first number of the plurality of first permissions and the plurality of first permissions comprise the plurality of third permissions so as to link the permission vector from the third job role to the first job role.

5. The method for permission management of claim 4, wherein generating the first permission structure directed graph according to the plurality of job roles by the management system further comprises:
calculating a weight value of the permission vector according to the first number of the plurality of first permissions and third number of the plurality of third permissions by the management system.

6. The method for permission management of claim 5, wherein the plurality of job roles comprise a plurality of first group roles and a plurality of second group roles, wherein selecting one of the plurality of job roles in the first permission structure directed graph as the target job role by the management system comprises:
selecting one of the plurality of first group roles as the target job role by the management system; and
selecting the plurality of second group roles as a plurality of isolated roles.

7. The method for permission management of claim 6, wherein the plurality of first group roles comprise the first job role and the third job role which are linked by the permission vector.

8. The method for permission management of claim 6, wherein generating the minimum directed spanning graph in the first permission structure directed graph according to the target job role by the management system comprises:
generating the minimum directed spanning graph according to the target job role and the plurality of first group roles by the management system.

9. The method for permission management of claim 8, wherein determining whether the permission and the job of each of the plurality of job roles in the first permission structure directed graph match by the management system comprises:

determining whether the permission of the plurality of second group roles as the plurality of isolated roles matches the job of the plurality of second group roles as the plurality of isolated roles by the management system; and adjusting the permission and the job of the plurality of second group roles as the plurality of isolated roles by the management system if it is determined that the permission of the plurality of second group roles as the plurality of isolated roles matches does not match the job of the plurality of second group roles as the plurality of isolated roles so as to generate the second permission structure directed graph.

* * * * *